United States Patent
Chen

(10) Patent No.: US 7,457,516 B2
(45) Date of Patent: Nov. 25, 2008

(54) VIDEO EDITING SYSTEM AND METHOD OF COMPUTER SYSTEM

(75) Inventor: Sheng-Hung Chen, Taipei (TW)

(73) Assignee: Intervideo Inc., Fremont, CA (US)

( * ) Notice: Subject to any disclaimer, the term of this patent is extended or adjusted under 35 U.S.C. 154(b) by 827 days.

(21) Appl. No.: 10/840,282

(22) Filed: May 7, 2004

(65) Prior Publication Data

US 2005/0259956 A1    Nov. 24, 2005

(51) Int. Cl.
G11B 7/00     (2006.01)
(52) U.S. Cl. ........................................................ 386/55
(58) Field of Classification Search ............. 386/46.55, 386/69.7; 707/501.1; 715/723; 360/72.2
See application file for complete search history.

(56) References Cited

U.S. PATENT DOCUMENTS

| | | | |
|---|---|---|---|
| 4,688,116 A * | 8/1987 | Takahashi et al. .......... 360/72.2 |
| 5,206,929 A * | 4/1993 | Langford et al. ............ 715/723 |
| 5,237,648 A * | 8/1993 | Mills et al. .................. 715/723 |
| 2002/0069218 A1* | 6/2002 | Sull et al. ................. 707/501.1 |
| 2003/0146915 A1* | 8/2003 | Brook et al. ................. 345/473 |
| 2004/0008970 A1* | 1/2004 | Junkersfeld et al. .......... 386/69 |
| 2004/0027368 A1* | 2/2004 | Snyder et al. ............... 345/716 |

* cited by examiner

Primary Examiner—Thai Tran
Assistant Examiner—Mishawn Dunn
(74) Attorney, Agent, or Firm—Rosenberg, Klein & Lee

(57) ABSTRACT

A video editing system and method of computer system disclose at least one play mark and at least one leap mark by a mark unit to mark a complete frame of video data provided by a display unit, moreover, through a P frame differential value provided by a detect unit which is read by a video capture unit, it captures a complete frame which is marked as a play mark and a P and a B frame which are related to the complete frame and not less than the P frame differential value. By the setting of the leap mark, it will save the times of forwarding and efficiently shorten the delayed time caused by the forwarding function; and after that, generates a smaller file through code conversion of the video data captured by the video capture unit with a transformed unit.

24 Claims, 5 Drawing Sheets

VIDEO EDITING SYSTEM AND METHOD OF COMPUTER SYSTEM

FIELD OF THE INVENTION

The present invention relates to a video editing system and method of computer system. By at least one play mark and at leap mark provided by a mark unit, it marks a complete frame of video data played by a display unit. It captures the complete frame of the play mark and related P frame and B frame through reading a P frame differential value by a video capture unit and efficiently shortens the waiting time caused by file access through the generation of a smaller file by a transformed unit.

BACKGROUND OF THE INVENTION

Since the development of computers, from vacuum-made first generation computers and passes through the second and the third generation computers to the personal computers at present, computers have strode across a wide gap of space-time, poor user's interfaces and prices and have gradually fused into people's everyday life. Due to the progress of information technology, the development of computers has already got into household appliance. People have been used to watch television, listen to the music, play DVDs or VCDs and spend their leisure time by computers. The rapid development of Internet since year 2000 further promotes the online buying of people. According to the research and prediction of e-Marketer, the B2C (Business to Customer) compound annual growth rate from year 2000 to year 2004 in Europe and Asia is 118% and 87% respectively, furthermore, by the rise of mobile-commerce, the flexibility of time and space has been increased. Such development has not only drawn the attention of industries but also brought about a revolution in new competitive chances.

From the web pages skimming by browsers driven by the rise of Internet, industries find a new sale direction. Original information application begins to try to offer people with services, such like internet shopping and casting a ballot online, by the viewing of web pages and capturing the internet information through browser end. Therefore, to have more consumers consume by the Internet, enterprises usually have to announce the "characteristic information" of their products on the Internet in a video form, and consumers further buy the products after the induction of desire to buy by the online viewing.

Most video data of the computer systems today use MPEG (Motion Pictures Expert Group) coding style as the compression format of video. Some common compression methods are Discrete Cosine Transform (DCT), Quantization and Huffman Encoding. In these algorithms, the size of every frame has to be the same so the algorithms themselves will dynamically change the extent of compression during the compression of each frame, but there is still extra compression action between the frames. Said action is known as inter-frame compression whose fundamental principle is eliminating the same parts in a series of frames, therefore rather than compressing each complete frame, we only have to take notice of the change between frames.

The MPEG image group is composed of three different compression frames called I frame, B frame and B frame. In the case of DCT compression, it transmits only low frequency part and eliminates high frequency part (those can't be seen by human eyes) after DCT transferred a frame. Among which, let's take I frame as an example, we usually call it internal coding frame which is the first piece of the image group and contains a complete frame of the image, therefore it can be decoded and displayed independently. In the case of P frame, which is called reference picture, it refers to the previous I frame and P frame and eliminates the repeated part in the frame and records only the difference between two frames. And in the case of B frame, which is called bi-directional correction frame. When said frames execute the same action, it may have some errors that will accumulate during the time, so all the data could be reset by inserting a frame indefinitely and the efficiency of the algorithm could be improved therefore by comparing the front and rare frames with the insertion of a special frame.

In the case of the MPEG playing style, because P frame and B frame eliminate the data amount required by displaying a specific frame with the reference of the front and rare frame, they are not complete data and can't be decoded and displayed independently. At the same time, I frame is a complete frame which can be decoded and displayed independently and therefore is the first frame played by the video. There are twelve frames between I frames that are composed of P frame and B frame. For example, the formation sequence of the frame decoded from a MPEG coded data is IBBPBBPBBPBBI. But the first I frame is transmitted at first while transmitting and followed by a P frame which records only the difference between two frames by referring to the first I frame and eliminating the repeated part in the frame. After that, B frames are transmitted in order to correct the errors of the first I frame and P frame during the time. On the analogy of this, another twelve frames led by a second I frame is transmitted to generate continuous playing images only after the first I frame and its related P frame and B frame is transmitted. So among the data size of these frame, I frame is the biggest one where P frame is smaller and B frame is the least one.

In the case of the MPEG compression style, usually a video file should contain a plurality of the following three file formats in order to be played. They are .VOB file, .IFO file and .BUP file separately. Each VOB file contains a combination of video, audio and subtitle stream; each IFO file provides an important guiding information required by a player such like where a chapter should begin and where a audio and subtitle stream should be located; while each BUP file is a backup file of a IFO file. Usually a DVD follows the playing specification derived from MPEG2 format which is 29.97 frames per second and transmits 3-10 MB per second and the transmission amount in one minute is about 180-600M. So, while using such compression format to generate product-introducing file, it needs three files to put it in the web page for viewing the product information of the consumers, and besides, it is limited by the size of the file and the band width of the internet and couldn't achieve the purpose of advertisement.

There are also many video transfer systems in the market for the requirement of Internet advertisement and sales, but all these systems transfer the complete video file to another file and can't meet the requirement of showing the product characteristics by video file. In addition to the drawback of limited file size difference, it may leave bad impression due to the long time of waiting for the video file of online product introducing and decrease the desire to buy and reduce the order numbers. Thus it is important to provide enterprises with a leap mark characteristic including system, which can mark up the part that can't show product characteristic and make a judgment by the mark while capturing and therefore eliminate the selection of frames of leap mark, to have video file with focal advertisement effect.

These years the standard of living has improved and fast foodism has sprung up, in the times of fast speed, when people take DVD viewing as a pastime they also want to leap those slow plot part by forwarding and view only those more critical part. Known frame forwarding function is counted by a multiple style; while forward the DVD when it is playing normally, users have to wait for the video system until it finds the position of I frame and therefore a frame lagging always happens. To solve the lagging problem mentioned above, some inventors proposed the solution of indexing table by recording the storage position of I frame in advance. When the forwarding function is stopped the position of I frame can be found quickly and decrease the lagging of played frame. Although many forwarding function have already be proposed according to the request of users, they still have to wait for the time spent by forwarding and sometimes have to adjust the part they want to see over and over between forwarding and rewinding because too much forwarding are made. Therefore, how to propose a leap function included system which can save the waiting time spent by the users is one of the problems should be considered while developing video system.

In the light of above, to propose a marking characteristic including video framework and the method thereof which not only can solve the drawback of traditional video file about not easy to be transmitted because of the big size and more than one files, but also provides a leaping video segment to save the time of users on waiting for the forwarding, and therefore enhances the application of enterprise's products advertisement, have been expected by the users and concerned by us for long. According to the research, development and sales experience on the video product, we have thought about the improvement and used our professional knowledge with many researches and designs and finally came up with a marking characteristic including video framework and the method thereof, which can solve the problem above.

SUMMARY OF THE INVENTION

The main purpose of the invention is to provide a video editing system and method of computer system which comprises a mark unit for providing at lest one play mark and leap mark and marking the complete frame of video data provided by said display unit thereby, through a video capture unit for capturing the complete frame and the complete frame related video data of the display unit which is marked as the play mark and through a transformed unit for reading video data captured by the video capture unit and for carrying out code compression transfer thereby.

Another purpose of the invention is to provide a dynamic frame capturing method by the setting of leap mark and play mark and the adjustment of the P frame differential value, dynamically captures the video frames played by the display unit and therefore rise the variability of the frames.

Another purpose of the invention is to provide a function that satisfies of the video playing and image editing at the same time. In the meanwhile of the video image played by a display unit, use the video capture unit to capture complete frames of the display unit which is marked as the play mark and the video data related the complete frame, and save it in a second storage unit. And through the image editing unit of the invention, carries out the editions such like addition, deletion and movement of the video data in the second storage unit.

Another purpose of the invention is to shorten the waiting time by the setting of the leap mark, leaps those frames of slow plot and decreases the times of forwarding function used by use end, further shorten the time waiting for forwarding. Another purpose of the invention is to reduce the size of the file. By the setting of the leap mark and the play mark and the adjustment of the P frame differential value, decreases the video set as the leap mark and the selection of a smaller variation P frame and reduces the size of the file output.

Another purpose of the invention is to decrease the lagging time from forwarding/rewinding. By the providing of an indexing table, records the storage position of the complete frame of a smaller size video data generated by the code transfer unit. The position of the complete frame of video data can be found soon while forwarding/rewinding and therefore efficiently reduces the lagging time come from the searching of complete frame.

Another purpose of the invention is to provide a practical use of electronic commerce. In the light of the band width of Internet, by the setting of the leap mark and the play mark and the adjustment of the P frame differential value, provides a use of smaller file in the Internet and efficiently accelerates the access speed of browser end.

Another purpose of the invention is to satisfy the requirement of browser end, namely, while browser end watches online in the web page, by the providing of a smaller sized file, efficiently reduces the time waiting for downloading of the file.

To sum up, the invention relates to a marking characteristic including video framework and the method thereof. By the mark unit of the invention that provides the play mark and the leap mark, it marks the complete frame of the video data played by the display unit wherein the play mark sets the video data to be watched and the leap mark sets the video file to be omitted. And through the reading of P frame differential value provided by the detect unit while the display is playing by the video capture unit, captures the complete frame which is marked as play mark and the complete frame related P frame and B frame which are not less than the P frame differential value. And it generates a smaller sized video file or animation file by a transformed unit according to the code compression transfer of the video data captured by the video capture unit at last. The invention satisfies the setting of P frame differential value from an use end according to the requirement and by the setting of the leap mark, leaps those part omitted to reduce the use of forwarding function by users, therefore further reduces the lagging time caused by forwarding. Moreover, by the providing of the image editing unit, an examination can be achieve before the frame is coded, to make the captured frames more smooth and have the expecting effect. The invention is further suitable for the development of electronic commerce. Under the limitation of band width of internet, a smaller product introducing video file could be provided to enterprises through the invention and therefore accelerates the time of access and shortens the time waiting for file downloading by browse end.

DETAILED DESCRIPTION OF THE PREFERRED EMBODIMENT

Figure 1:
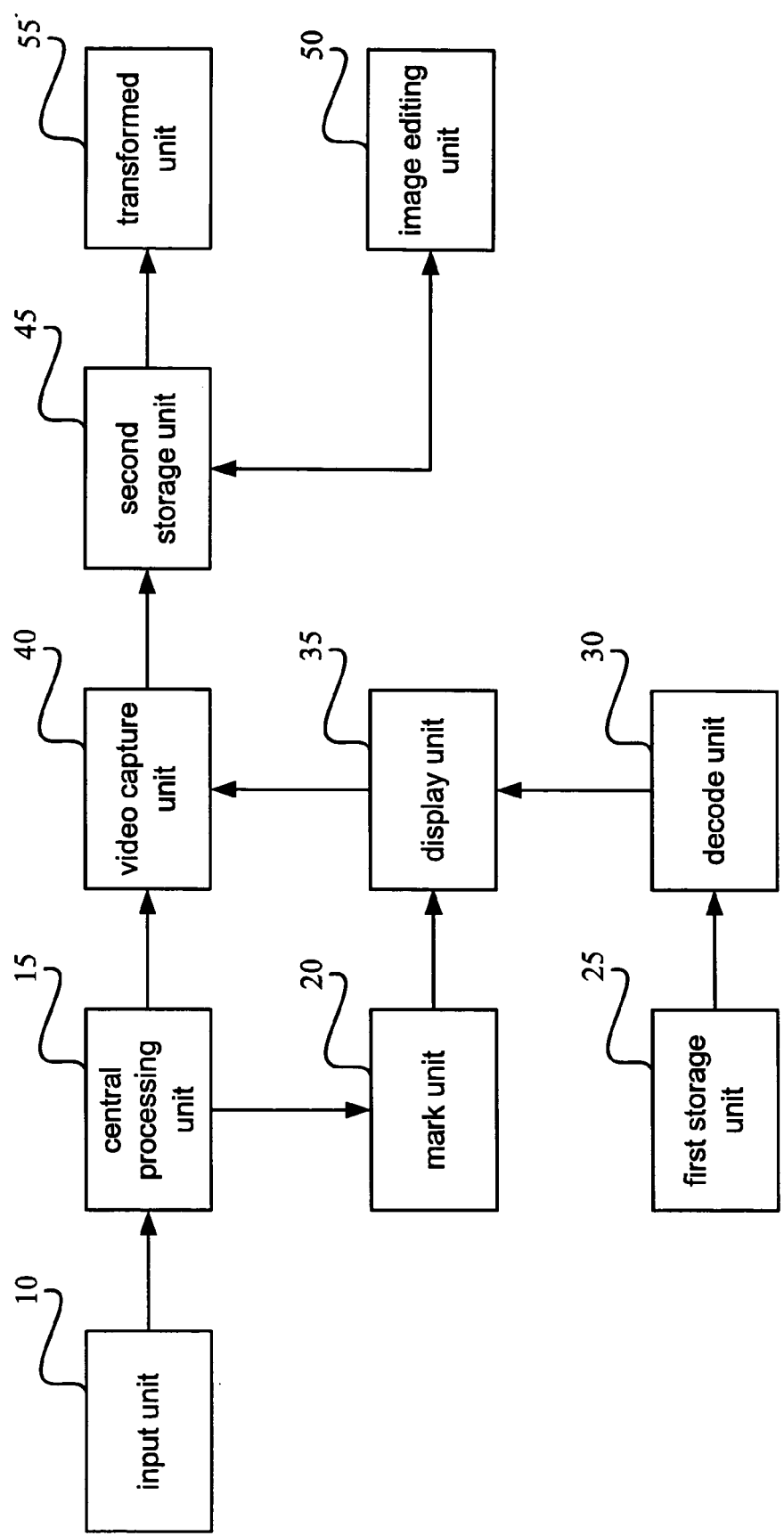
FIG. 1 is a diagram of a preferred embodiment of the invention.

To let the examiner knows further about the features of the invention and the efficacy it achieves, the following is a preferred embodiment and illustration of the invention:

Please refer to FIG. 1, a video editing system of computer system comprises an input unit 10, which is used to give a mark setting command by the use end and drives a mark unit 20 to carry out the marking through the receiving of the command by a central processing unit 15. In the first place, the use end provides at least one video data in a first storage unit 25. Then a decode unit 30 receives the video data in the first storage unit 25 and decodes it. After decoding, provides a display unit 35. While playing action is going on, the use end can proceed with a play mark or a leap mark setting by the mark unit against at least one complete frame of the video data played. And among which, the complete frame could be an I frame of MPEG format. In addition, through a video capture unit 40 driven by the central processing unit 15, captures the complete frame and P frames and B frames related to the complete frame according to the complete frame of the video data which is marked as play mark by the mark unit 20. Then stores the captured image frame in a second storage unit 45, and after that, a transformed unit 55 will generate a smaller sized animation file or video file by the code compression transfer according to the video data saved in the second storage unit 45.

Among which, the play mark means that the use end sets the complete frame of the video data played by the display unit as a segment to watch, while the leap mark means that the use end sets the complete frame of the video data played by the display unit as a segment to omit. By the setting of the play mark and the leap mark use end can randomly choose the segment wanted and therefore reduces the times of forwarding and further shortens the waiting of lagging time due to forwarding. A code transfer unit 55 provides a video file of Motion JPEG compression format, and an animation file of Motion Gif compression format or any other compression format that can play dynamically.

Said video data in the first storage unit is a compression file of MPEG coded format which includes a plurality of VOB, IFO and BUP files, wherein each VOB file contains a combination of many streams such like video, audio and subtitle stream. Moreover, the content of VOB file further contains a I frame which contains more than one complete frames, a P frame of reference image and a B frame of correction image, therefore inside the first storage unit 25 is a bigger sized video file.

The video editing system of computer system further comprises an image editing unit 50 and a mark indexing table wherein the image editing unit 50 can send the video file inside second storage unit 45 into the image editing unit 50 and carries out editing actions like addition, deletion, movement and so on; said mark indexing table records the storage position of the complete frame of the video data marked as play mark by the mark unit 20, for leaping those segment not set as a play mark while forwarding or rewinding and finding the playing position of the complete frame quickly, which efficiently reduces the lagging time due to the finding of a complete frame by forwarding of rewinding.

Figure 2:
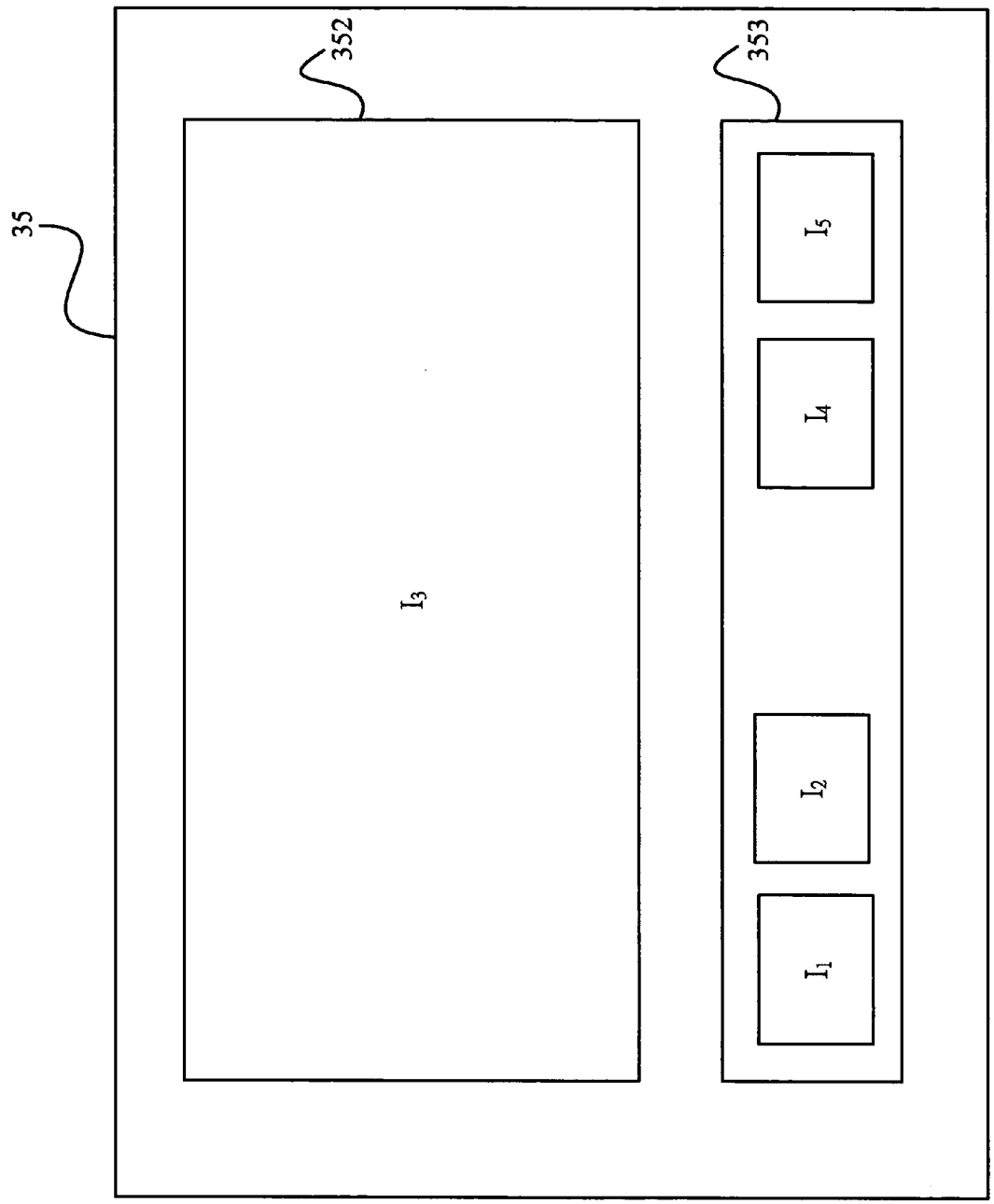
FIG. 2 is a diagram of the frame of the display unit of a preferred embodiment of the invention.

Please refer to FIG. 2, the display unit 35 includes a first display frame 351 which shows the complete frame of the video data currently selected by the use end, a second display frame 352 which shows at least one previous complete frame and at least one following complete frame currently selected by the use end. As shown in the figure, the first display frame 351 shows the $I_3$ frame selected by the use end while the second display frame 352 shows two complete frames $I_1$ and $I_2$ prior to $I_3$ and two following complete frames $I_4$ and $I_5$. The use end can choose whether mark or not by watching the $I_3$ frame the related P frame and B frame. If yes, then it can stop the playing of the first display frame 351 and set the play mark to the $I_3$ frame.

Figure 3:
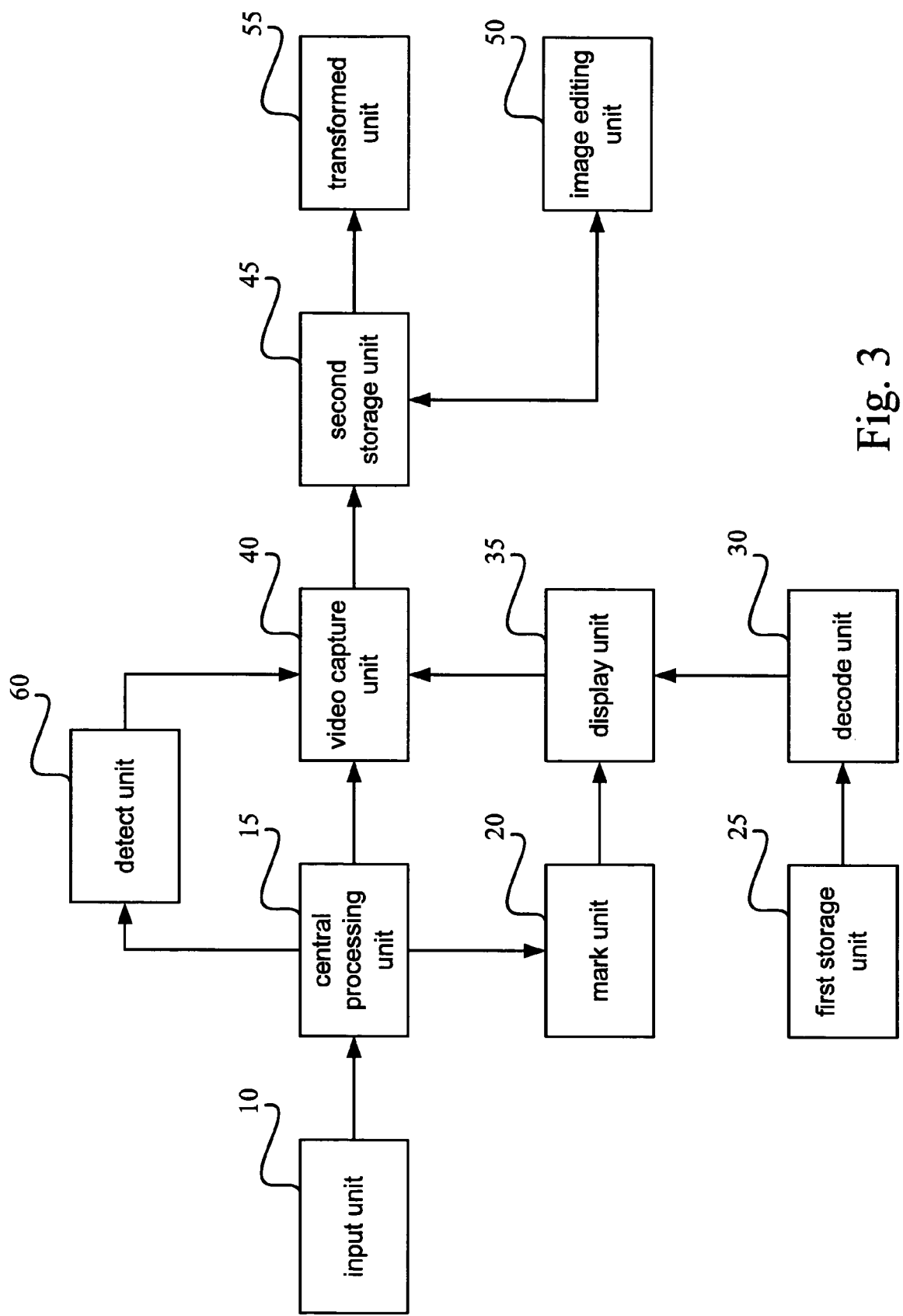
FIG. 3 is a diagram with a detect unit of a preferred embodiment of the invention.

Please refer to FIG. 3, the video editing system of computer system further comprises a detect unit 60 which provides a P frame differential value. The video capture unit 40 can read the P frame differential value provided by the detect unit 60 and compare the P frame variation and the P frame differential value, according to the complete frame of the video data which is marked as a play mark by the mark unit 20 while capturing the complete frame and the complete frame related P frame and B frame. When the P frame variation is less than the P frame differential value, it means that the difference between frames is not large; therefore it will give up the capturing of this P frame. In which, the P frame differential value can be adjusted according to the requirement by the use end through the central processing unit 15. In addition, as to the B frame, the invention captures all the complete frame related B frames which are marked as play marks and place the positions of B frames properly through the providing of the image editing unit 50. By these steps, while frame capturing is finished it can not only satisfy the smooth playing of the frames captured, but also efficiently reduce the size of the file generated by the code transfer unit 55 by further set of the play mark and the leap mark and the P frame differential value.

Figure 4:
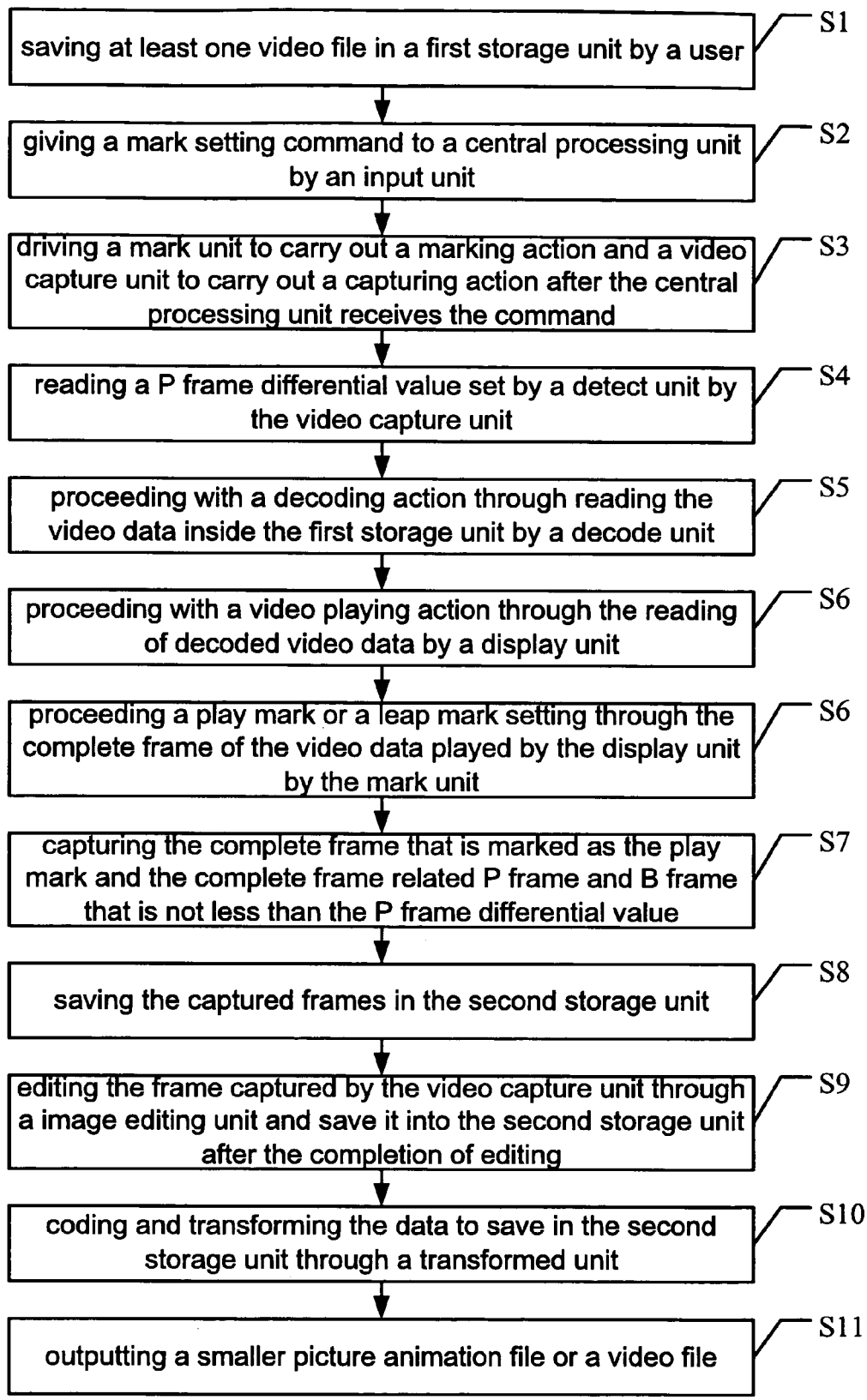
FIG. 4 is a flow chart of a preferred embodiment of the invention.

Refer to FIG. 4, which is a flow chart of one of the preferred embodiments of the present invention. A video editing method of computer system comprises the steps of:

Step S1: saving at least one video file in a first storage unit by a user;

Step S2: giving a mark setting command to a central processing unit by an input unit;

Step S3: driving a mark unit to carry out a marking action and a video capture unit to carry out a capturing action after the central processing unit receives the command;

Step S4: reading a P frame differential value set by a detect unit by the video capture unit;

Step S5: proceeding with a decoding action through reading the video data inside the first storage unit by a decode unit;

Step S6: proceeding with a video playing action through the reading of decoded video data by a display unit;

Step S7: proceeding a play mark or a leap mark setting through the complete frame of the video data played by the display unit by the mark unit;

Step S8: capturing the complete frame that is marked as the play mark and the complete frame related P frame and B frame that is not less than the P frame differential value;

Step S9: saving the captured frames in the second storage unit;

Step S10: editing the frame captured by the video capture unit through a image editing unit and save it into the second storage unit after the completion of editing;

Step 11: coding and transforming the data to save in the second storage unit through a transformed unit; and Step S12: outputting a smaller picture animation file or a video file.

Figure 5:
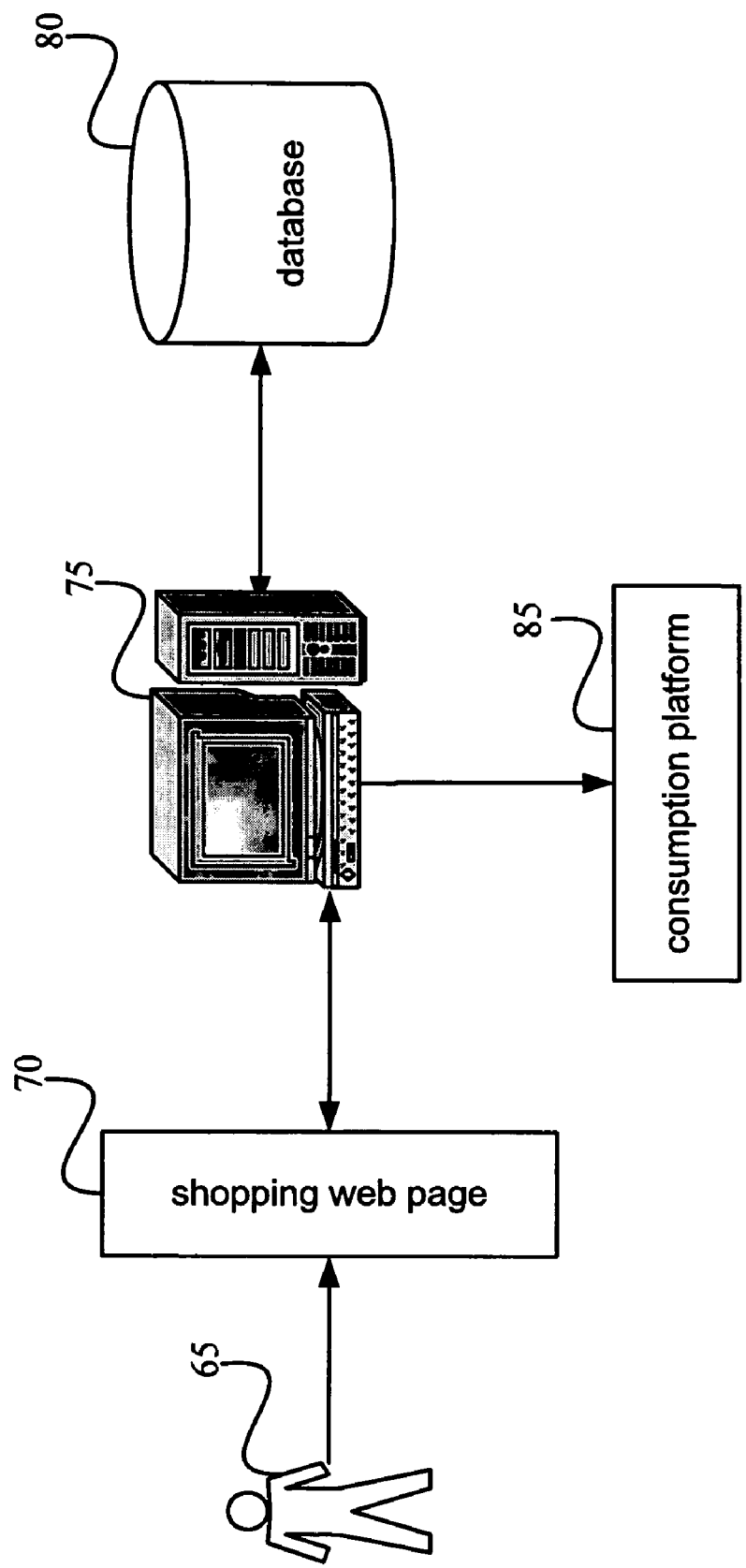
FIG. 5 is a schematic diagram of the business model system of the invention.

For further explaining the use of the present invention in practice, a sample illustration according to the business model on Internet is conducted. Please refer to FIG. 5, which is the business model system of one of the preferred embodiments of present invention, comprises a server device 75 for continuously receiving the consuming activity of a browse end 65. When a browse end 65 enters a shopping web page 70 and click the product introducing video file which in demand, the shopping web page 70 will immediately catch the play mark and the leap mark and the smaller product introducing video file produced by the P frame differential value from the database 80, and provides the browse end 65 with online watching. Because the product introducing video file is a smaller file, the browse end 65 doesn't have to wait for a ling time while downloading. After finishing watching and have a desire to buy, the browse end 65 can conduct a buying action through a consumption platform 85.

To sum up, the present invention comprises a mark unit for providing a play mark and a leap mark. When the use end gives an exterior command, through the receiving of the exterior command of the input unit by the central processing unit, it drives the mark unit to carry out the marking action and then drives the video capture unit to capture the video data which is marked as a play mark; a first storage unit which provides at least one video data for a decode unit to decode it. After that, through the reading of the decoded data provided by the decode unit, a display unit carries out the playing of it. The mark unit marks the complete frame of video data played by the display unit, and captures the complete frame which is marked as a play mark and the complete frame related P frame and B frame which are not less than the P frame differential value and then saves it in a second storage unit; a transformed unit for generating a smaller sized video file or animation file according to the code compressing transfer of the video data saved in the second storage unit. The present invention satisfies the requirement of a use end and can dynamically adjust the setting of the P frame differential value, moreover, generates the expected file by the providing of the image-editing unit. The present invention is further suitable for the development of electronic commerce. Through the present invention, enterprises can generate a smaller sized file, accelerate the accessing speed and shorten the time waiting for file downloading under the limitation of the band width of Internet. Therefore, the present invention is indeed an invention with novelty, non-obviousness and industrial utility and meets the requirements of the Patent Law. So the application is applied and hopes the patent could be granted earlier.

However, the thing mentioned above is just a preferred embodiment of the invention and couldn't be the limitation of the embodiment of the invention. So things such like the changes and modifications of the shape, structure, characteristic and the spirit under the claims should be included in the claims of the invention.

What is claimed is:

1. A video editing system of a computer system, comprising:
   a display unit for receiving decoded video signals and then displaying a series of frames of the decoded video signals;
   a mark unit for providing at least one playback mark and at least one leap mark for respectively setting which frame of the frames of the decoded video signals is to playback and which frame of the frames of the decoded video signals is not to playback;
   a video capture unit for continuously and automatically capturing the frame which is marked with the playback mark and discarding the frame which is marked with the leap mark; said frame including I, P, and B frames, wherein said video capture unit captures only those P frames having a data variation value from a preceding P frame greater than a pre-determined differential value of the P frame; and
   a transform unit for receiving, encoding and compressing at least one frame which is marked with the playback mark from said video capture unit, then transforming the at least one frame into a single file.

2. The video editing system of computer system of claim 1, wherein said decoded video signals are compatible with MPEG format.

3. The video editing system of computer system of claim 1, wherein said mark unit further comprises a mark index table for recording the physical storage location of the frame marked with the playback mark.

4. The video editing system of computer system of claim 1, wherein said video editing system further comprises a decode unit for receiving at least one encoded video signal, then decoding said encoded video signals into said decoded video signal.

5. The video editing system of computer system of claim 4, wherein said encoded video signal is compatible with MPEG format.

6. The video editing system of computer system of claim 1, wherein said video editing system further comprises an input unit for providing at least one setting of said playback mark and said leap mark.

7. The video editing system of computer system of claim 1, wherein said video editing system further comprises a detect unit for checking a different rate of adjacent frames which are marked with the playback mark.

8. The video editing system of computer system of claim 7, wherein said video capture unit discards the adjacent frames detected by the detect unit, which are marked with the playback mark, having a different rate.

9. The video editing system of computer system of claim 1, wherein said video editing system further comprises a storage unit for storing the frame captured by the video capture unit.

10. The video editing system of computer system of claim 1, wherein said single file is an animation file.

11. The video editing system of computer system of claim 10, wherein said animation file is compatible with JPEG format.

12. The video editing system of computer system of claim 10, wherein said animation file is compatible with GIF format.

13. A video editing method of a computer system, comprising:
   (a) receiving decoded video signals and then displaying a series of frames of the decoded video signals;
   (b) providing at least one playback mark and at least one leap mark from a mark unit for respectively setting which frame of the frames of the decoded video signals is to playback and which frame of the frames of the decoded video signals is not to playback;
   (c) capturing the frame which is marked with the playback mark and discarding the frame which is marked with the leap mark; wherein said frame includes I, P, and B frames, and wherein the step of capturing includes only those P frames having a data variation value from a preceding P frame greater than a pre-determined differential value of the P frame; and
   (d) receiving, encoding and compressing at least one frame which is marked with the playback mark, then transforming the at least one frame into a single file.

14. The method of claim 13, wherein said decoded video signals are compatible with MPEG format.

15. The method of claim 13, wherein said mark unit further comprises a mark index table for recording the physical storage location of the frame marked with the playback mark.

16. The method of claim 13, wherein before step
(a) further comprises a step of receiving at least one encoded video signal, then decoding said encoded video signals into said decoded video signal.

17. The method of claim 16, wherein said encoded video signal is compatible with MPEG format.

18. The method of claim 13, wherein said mark unit is provided by an input device.

19. The method of claim 13, wherein before step (d) further comprises a step (cl) of checking a different rate of adjacent frames which are marked with the playback mark.

20. The method of claim 19, wherein the adjacent frames detected by the detect unit, which are marked with the playback mark, having a different rate, are discarded.

21. The method of claim 13, wherein the step (c) further comprises a step (c2) for storing the frame captured.

22. The method of claim 13, wherein said single file is an animation file.

23. The method of claim 22, wherein said animation file is compatible with JPEG format.

24. The method of claim 22, wherein said animation file is compatible with GIF format.

* * * * *